June 24, 1930.   B. L. NEWKIRK   1,768,290
HIGH SPEED MACHINE
Filed Sept. 22, 1923   3 Sheets-Sheet 1
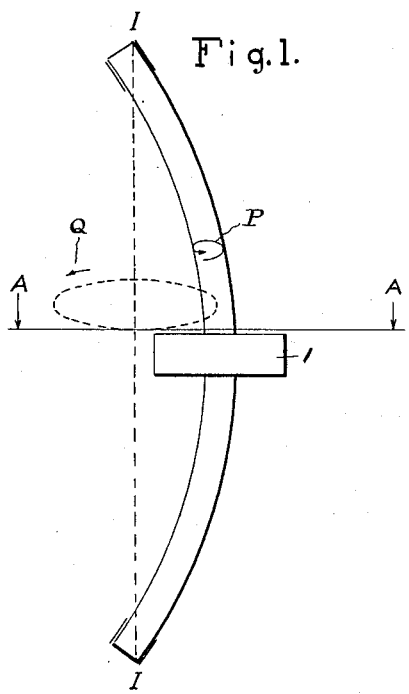
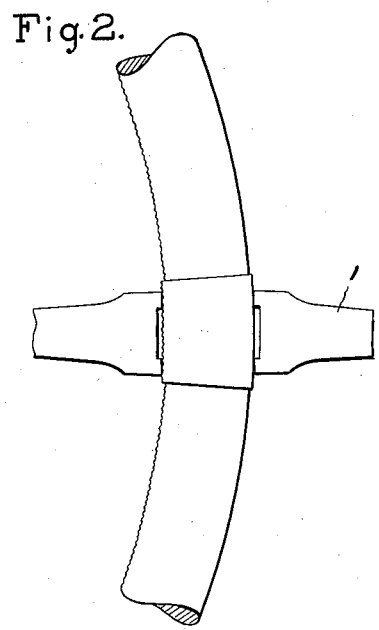
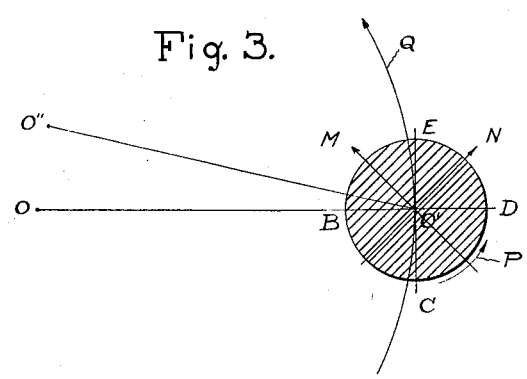
Inventor:
Burt L. Newkirk,
by
His Attorney.

June 24, 1930.  B. L. NEWKIRK  1,768,290
HIGH SPEED MACHINE
Filed Sept. 22, 1923   3 Sheets-Sheet 2
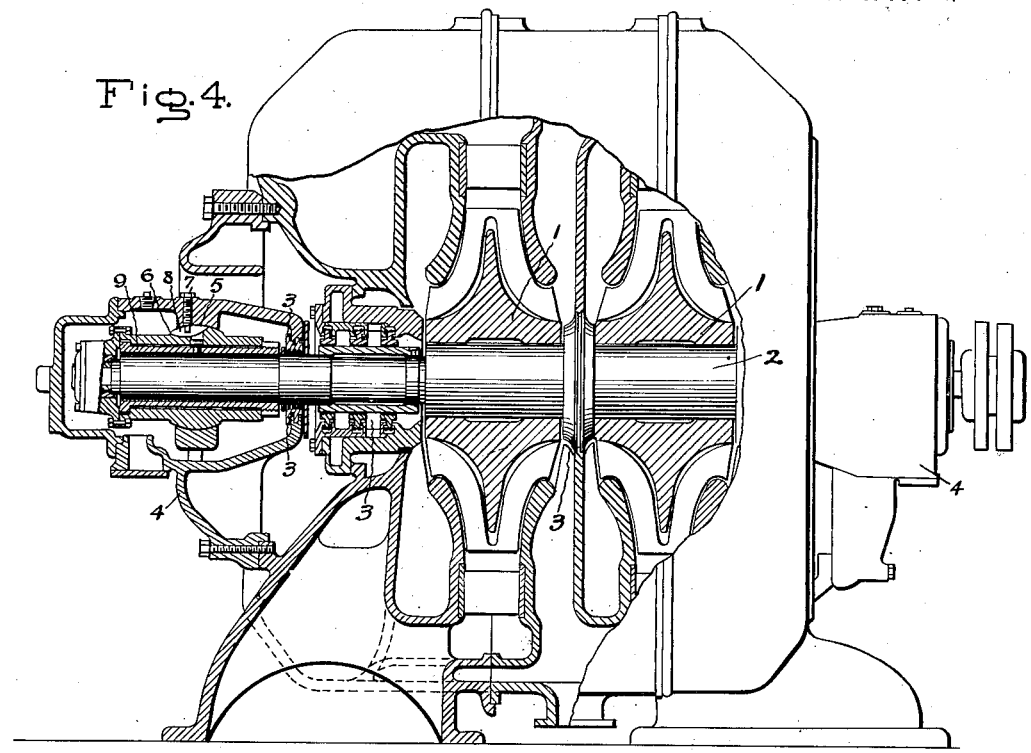
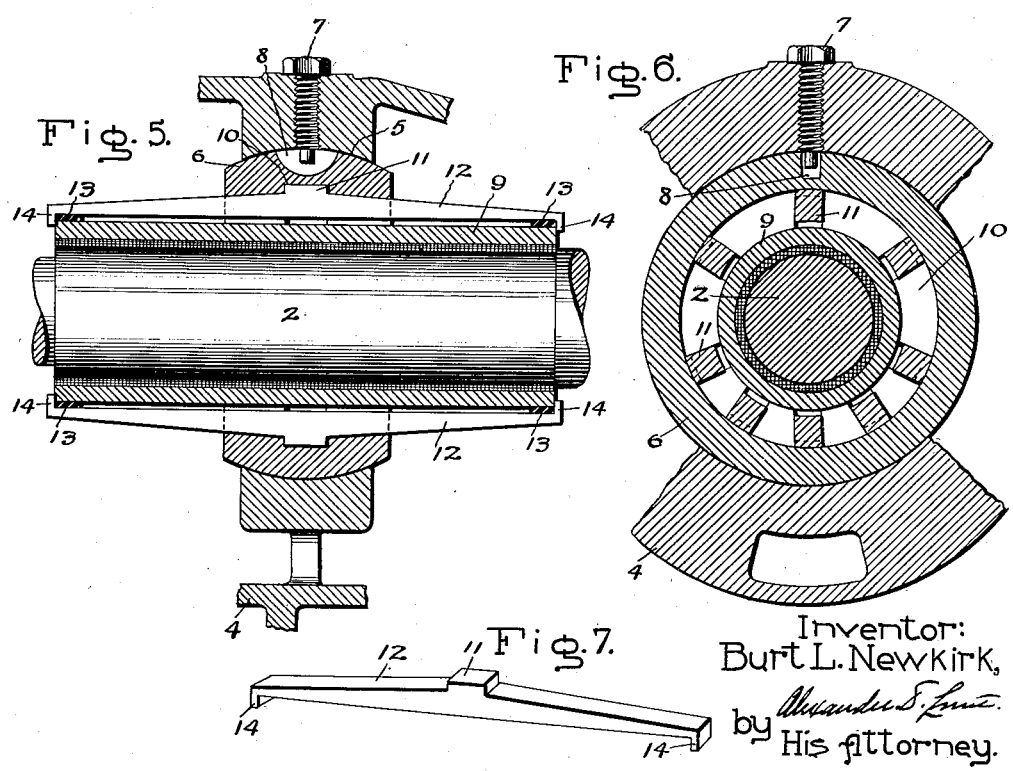
Inventor:
Burt L. Newkirk,
by His Attorney.

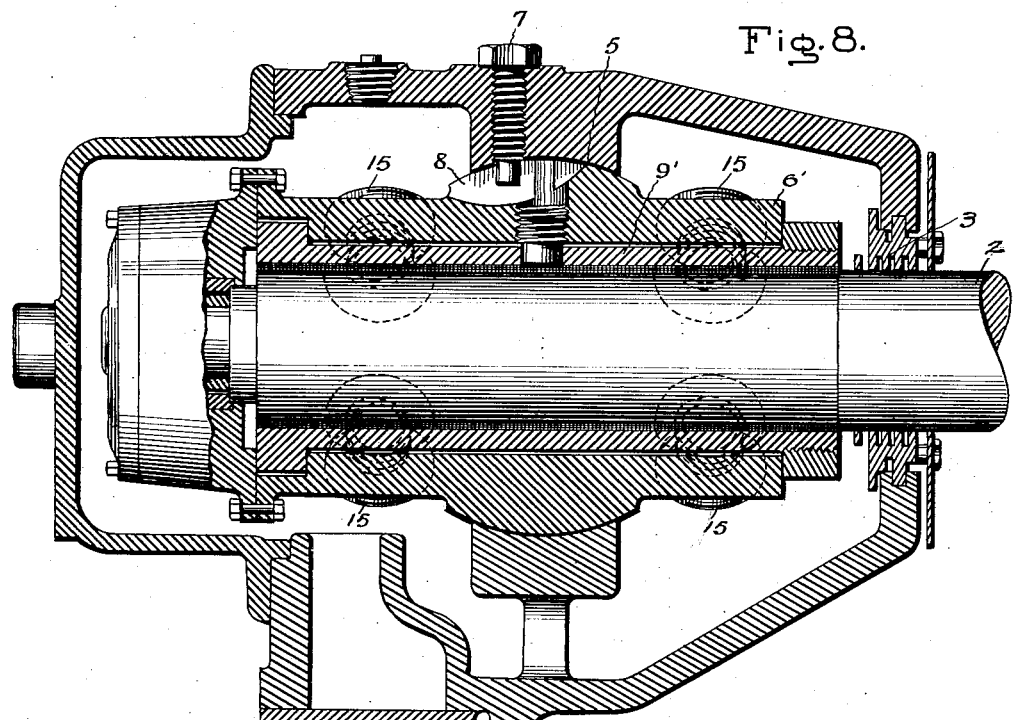
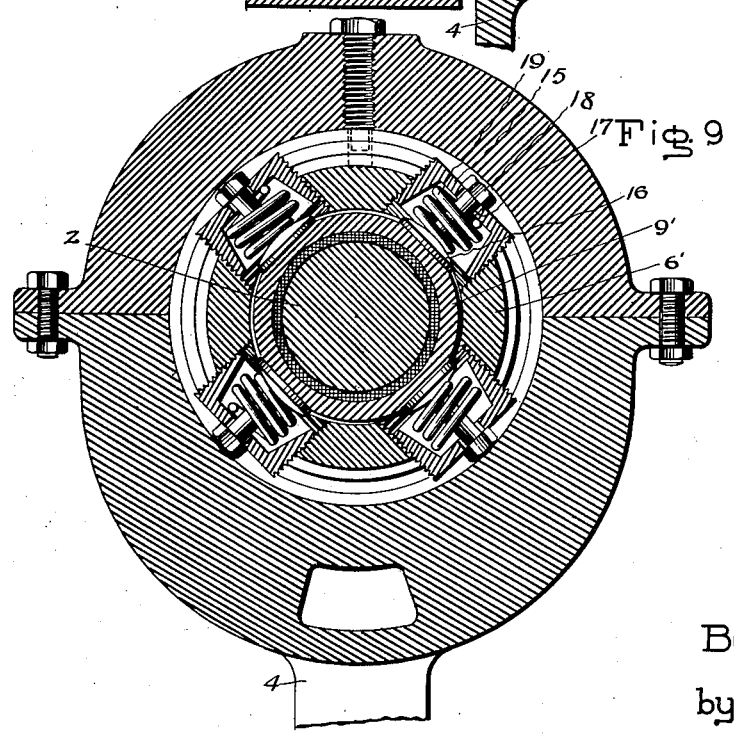
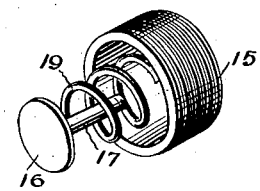

Patented June 24, 1930

1,768,290

UNITED STATES PATENT OFFICE

BURT L. NEWKIRK, OF SCHENECTADY, NEW YORK, ASSIGNOR TO GENERAL ELECTRIC COMPANY, A CORPORATION OF NEW YORK

HIGH-SPEED MACHINE

Application filed September 22, 1923. Serial No. 664,331.

The present invention relates to high speed rotary machines and has for its object the provision of means for preventing the manifestations of some of the troubles that have been experienced heretofore in the practical operation of such machines.

During the early history of the steam turbine art, it was considered impractical to drive the rotating element faster than the so-called critical speed, where the number of revolutions per minute corresponds with the number of natural or harmonic vibrations of the element. De Laval however, did accomplish this by using a very light flexible shaft and accelerating the rotor rapidly through its critical speed. Guard rings were used to limit the whirl of the shaft as it came up through its critical speed. The use of guard rings is applicable to small machines only.

Larger machines were usually designed to run below their critical speeds, but even in the lower ranges of speed they sometimes developed serious vibration. Various means were proposed to meet these difficulties. Parsons employed bearings for the rotating element, composed of loose concentric sleeves immersed in a bath of oil, which were intended to damp any transverse vibration of the rotor. The use of spring bearings, usually including some device to introduce frictional resistance to the vibratory motion of the rotor was also proposed.

None of these devices has come into general use for it was found possible to eliminate the cause of the vibrational disturbances which were troublesome at that time by accurate mass balancing. At the present time it is generally practical to accelerate a rotor which is accurately balanced up through its critical speed range without guard rings or any of the other devices which were formerly used or proposed to damp out vibration.

This advance in the art of balancing has opened the field of operation above the critical speed to steam turbines, centrifugal compressors and other machines with rotating elements.

However, it occasionally happens that an accurately balanced machine when driven above its critical speed will jar more or less violently. Sometimes the jarring is so violent that it is impractical to continue the machine in operation. At other times operation may be continued, but always with danger of damage to the machine.

The jarring phenomena and the means which I have devised to avoid their manifestation will be better understood by reference to the accompanying drawings taken in connection with the following description.

In the accompanying drawing forming part of this specification, Figs. 1, 2 and 3 illustrate diagrammatically the behavior of a whirling shaft and the directions of forces existing therein.

Fig. 4 shows partly in elevationed outline and partly in section, a turbo air compressor provided with a spring supported bearing at one end of its rotor shaft.

Fig. 5 is an enlarged longitudinal section of one form of spring supported bearing.

Fig. 6 is a transverse section thereof.

Fig. 7 is a perspective view of a detached spring bar therefor.

Fig. 8 is an enlarged longitudinal section of another form of spring supported bearing.

Fig. 9 is a transverse section thereof, and

Fig. 10 is a perspective view of a detached spring and its adjusting and retaining means.

The phenomena are manifested in a whirling motion of the rotor. In the course of this whirl the axis of the rotor describes a surface which (if the rotor is perfectly balanced) has the shape of a spindle. If it is not perfectly balanced this spindle shaped surface may have a cross section which is nearly circular or it may be elliptical, or even quite flat so that it becomes very nearly if not entirely a plane surface. This whirl occurs in the frequency of the critical speed. That is, for example, a rotor having a critical speed of 1000 R. P. M. and running at 3000 R. P. M. will whirl in a frequency of 1000 R. P. M. This whirl does not occur unless the rotor runs above its critical speed. This motion is illustrated in Fig. 1 of the drawings. In this illustration the shaft is vertical and assumed to be in perfect dynamic balance. If the critical speed of this rotor is 1000 R. P. M., the shaft will make 1000 complete whirls per minute, but if the rotor is assumed to be running at 3000 R. P. M., it will make three revolutions in the course of each whirl. If the rotation speed should be increased to 3500 R. P. M., the whirling speed would not change and the rotor would make three and a half revolutions in the course of each whirl.

The fundamental cause of this phenomenon was found to be due to a certain friction between the shaft surface and the hubs of impeller wheels 1, or packing sleeves 3, or other members which are pressed or shrunk on the shafts 2 (see Fig. 4). This friction effect is illustrated in Fig. 2. When the shaft bends slip occurs at the fit between the surface of the shaft and the part shrunk thereon. There is frictional resistance offered to this slipping motion. When a shaft whirls, as shown in Fig. 1, with a rotation speed different from the whirling speed, there is continual slipping at the surface of the shaft. If the rotation speed is higher than the whirling speed, this slipping tends to maintain the whirl by a process I will endeavor to explain. The friction which is responsible for this effect I have called "internal friction of the rotor." The problem of designing suitable proportions and details at the hubs of impellers and bucket wheels is difficult, especially in the case of slender shafts running at high speeds, and in some cases large internal friction of the rotor cannot be avoided. It is impossible to run such rotors successfully without some means to offset the tendency of the rotors to whirl.

The process by which the internal friction of the rotor builds up or maintains the whirl may be explained as follows: Fig. 1 represents a shaft having one disk shrunk thereon and whirling about the vertical axis I I. An enlarged view of a section of the shaft at A A looking in direction of the arrows is shown in Fig. 3. The point O represents the normal position of the shaft center and the distance O O' is the radius of the whirl, which in this case is assumed to be circular. The direction of rotation of the shaft and the direction of the whirl are indicated by arrows P and Q respectively. Owing to the bend of the shaft the material of the shaft near B instantaneously on the inside of the bend is under compression and the material near D instantaneously on the outside is in tension. As the shaft rotation and whirl progress, however, the shaft rotation being at a more rapid rate than the whirl, the points B and D do not remain on the inside and outside respectively. The line B D rotates relative to the line O O' so that each element of the shaft in turn is alternately compressed and extended. Such compression and extension produce corresponding changes of length of elements of the shaft, with slipping within the hub of the disk 1. The frictional resistance to slipping increases the apparent stiffness of the shaft elements at each point of the arc E B because these shaft elements are being shortened and are assisted in their resistance to deformation by the friction. The shaft elements along the arc B C however, are regaining their normal length and the friction which accompanies this action works against it and decreases the apparent stiffness of these elements. At C the shaft elements have their normal lengths. Along the arc C D the shaft elements are being lengthened again and the friction increases their resistances to this deformation, that is, it increases their apparent stiffness. The elements along the arc D E are regaining their normal length but are impeded in this action by the frictional resistance, and their apparent stiffness is, therefore, decreased by the friction. The total effect of the internal friction of the rotor is therefore to give the shaft greater stiffness in the direction of the arrow M than in that of the arrow N. The shaft then has the elastic property of a rectangular beam having the longer dimension of its cross section parallel to M. It is well known that a beam having this property if deflected to shift its center from O to O' would exert a restoring force in the direction of some point O''. The elastic restoring force due to the bending of the shaft is, thus, modified by the internal friction of the rotor, and this modified restoring force has the direction O' O''. This restoring force may be resolved into a component toward O, which supplies the centripetal force necessary to the whirling motion, and another component at right angles to the line O O'. This latter component is the force which maintains the whirl.

The above explanation shows how the cramping at a hub fit on a shaft maintains a whirl once it is started. If by any means the shaft is bent while running above its critical speed the slipping action just described begins concurrently and a force is developed as described, tending to build up a whirl. Such bending of the shaft, of sufficient magnitude to start whirling when a shaft runs above its critical speed, arises from the slight shocks incident to the operation of certain machines, notably blast furnace compressors. These shocks may be due to the turbulent motion of the air, or to irregular action of the oil film in the bearings, or to other causes. If the shaft carries several impellers 1, and a number of packing sleeves 3, and especially if the shaft is quite flexible (which is a great advantage in some designs) it is likely to have considerable internal friction and if so it cannot be operated without jarring of sufficient magnitude to start the whirling action as explained above.

Means to overcome the practical troubles incident to shaft whirling I have found in the use in this connection of a yieldably supported bearing to protect the shaft from bending under the shocks incident to operation. A bearing of this sort yields to the shocks, and the shaft when so supported bends less under shocks or jars than it would if solidly supported, consequently the yielding bearing protects the shaft against the initial bend which starts the whirling action, as described above.

The yielding bearing probably operates also to prevent any tendency to build up the whirling action. The resistance of the air or other medium in which the rotor whirls tends to suppress the whirling motion. This and other damping effects depend undoubtedly on the radius of the whirl. The whirling stimulus, however, as explained above, depends on the bend in the shaft. There is thus in every case of whirling a conflict of the damping tendencies with the whirling stimulus. The yielding bearing permits a given radius of whirl with a smaller bend in the shaft than would exist with the same radius of whirl if the bearing did not yield. The effect of the yielding bearing is therefore to secure a more favorable ratio of the natural damping tendencies to the whirling stimulus.

It will be understood from the explanation given above that the purely elastic action of the yielding bearing should be sufficient for the prevention of the whirling action. A certain absorption of energy in damping attends the yielding of the bearing support. It is believed that the simple cases in which this whirling may occur (when for example the shaft carries only one impeller) are remedied by the purely elastic action only, and that the incidental damping friction plays no essential part in the action. There are more complex forms of the whirling phenomenon, which however, are fundamentally identical with the simple case described above, in which the damping action of the yielding bearing support seems to be essential to suppression of the whirling. Since the installation of yieldable bearings on machines which formerly were very difficult to operate successfully, these machines have been in continuous operation for long periods of time without trouble.

The use of spring bearings to overcome vibration has been proposed heretofore and abandoned, but it is believed that the phenomenon described above did not occur in the days when these proposals were made and that it has not been analyzed or studied successfully heretofore. The application of a spring bearing to overcome this difficulty is to be regarded as highly useful from a practical standpoint.

As indicated in Fig. 4 of the accompanying drawings, it is the usual practice in the construction of steam turbines and centrifugal air compressors to mount a series of impellers or bucket wheels 1 upon a single shaft 2. These wheels, in order to sustain the excessive centrifugal stresses imposed thereon by the high speeds at which they are driven, have the great majority of their mass located at or about their central portions in the form of increased thickness which thus provides an extended hub or sleeve through which the shaft extends and to which they are customarily attached by pressed or shrunk joints. At each end of the shaft and between impellers or bucket wheels long sleeved stuffing boxes 3 are provided to prevent escape of steam or air while permitting the shaft to rotate therein. The greater portion of the length of the shaft is thus encased in tight fitting sleeves, which as stated, present great internal friction to oppose the free elastic movement of the shaft.

The ends of the shaft are supported in bearing brackets 4 secured to opposite ends of the machine. The bracket as shown in section at the lefthand or delivery end is provided with a spherical cavity 5 for the reception of a ball seat 6 which is free to cradle therein but held from rotation by means of a set screw 7 carried by the bracket 4 and engaging a slot 8 cut longitudinally in the periphery of the ball seat. The ball seat is bored out longitudinally for the reception of the bearing lining 9 having a bore to receive the end of the shaft and a cylindrical outer surface whose diameter is less than that of the bore in the spherical seat 6 so as to provide play room for the radial movement of the former within the latter. The lining 9 is yieldingly held centrally of the ball seat by springs interposed between those parts.

As shown in Figs. 5, 6 and 7, the ball seat 7 is provided on its inner wall with an annular groove 10 for the reception of fulcrum projections 11 at the centers of spring levers 12 designed to extend parallel to the shaft axis in spaced relation about the lining 9 and engaging at their free ends with wearing pads 13 made of flat metal and seated upon the ends of the lining 9. The ends of the spring levers 12 are bent over to form retaining fingers 14 for engaging the ends of the lining 9 and holding it positioned axially of the ball seat 6.

A spring bearing thus formed has been found effective to protect the shaft from the shocks incident to operation or vibration, although the actual movement of the lining is only a few thousandths of an inch. There are, however, cases where an adjustable spring bearing is more satisfactory than the non-adjustable bearing just described.

In the arrangement shown in Figs. 8, 9 and 10, the ball seat 6' is provided with four threaded radial holes adjacent each end for the reception of threaded shell plugs 15. Each plug carries an axially movable plunger comprising a thrust plate 16 adapted to bear against the outer surface of the lining 9' and having a threaded shank 17 passing freely through an aperture in the end wall of the plug and engaging a nut 18 on the outer side thereof, and a stout helical spring 19 surrounding the shank 17 and thrusting at its ends against the inside of the shell plug and the outside of the thrust plate. The tension of the spring can be adjusted by screwing the plug in or out of its threaded radial hole in the ball seat and its extent of radial movement may be limited by screwing the nut 18 one way or the other on the shank 17 of the plunger. It is evident that by proper adjustment the lining 9' can be held yieldingly as firm as desired and that the extent to which the plungers may follow up the movement of the lining may be limited very definitely so as to prevent tetering or resonant development of motion while being free to yield instantly to any shock that would tend to bend the shaft.

While I have found a single spring bearing inserted at the delivery end of an air compressor effectually to overcome the rotating troubles in a machine which with ordinary bearings was wholly inoperable, I propose in certain cases to equip all bearings of high speed rotors with yielding means, since it is possible to limit the transverse movement of the bearings to any degree of refinement and thus leave the clearances between buckets and nozzles uneffected to all practical intents and purposes by the introduction of the yielding bearings. Moreover, my invention is not limited in its application to steam turbines and centrifugal air compressors, but is useful in any high speed machine in which the rotating element is subject to or develops internal friction.

While I have shown and described the best embodiment of the invention known to me, I do not desire to be restricted thereto.

What I claim as new and desire to secure by Letters Patent of the United States, is:

1. The combination of a mechanical rotor normally operated above its critical speed and subject to the development of internal friction when so operated, and a yieldingly supported bearing in which said rotor is journalled, whereby whipping of the rotor is prevented.

2. The combination in a rotary machine, of a flexible rotating element adapted to run above its critical speed and composed of multiple parts frictionally joined together and subject to the development of internal friction when operated, and a bearing for said element having freely yieldable supporting means whereby the tendency of said element to develop whirling or whipping motion is overcome and the vibrations thereof dampened.

3. The combination in a machine having a flexible rotating element composed of multiple parts frictionally joined together and subject to the development of internal friction when operated and designed to run faster than its critical speed, of a bearing for said rotating element yieldingly mounted for free transverse motion whereby the tendency of the element to bend in operation is overcome.

4. The combination in a machine having a flexible rotating element composed of a shaft and parts with sleeves or collars tightly fitting said shaft and subject to the development of internal friction when operated, of a radially yielding bearing for said shaft adapted to prevent the building up of whipping or whirling motion of the element while rotating faster than its critical speed.

In witness whereof, I have hereunto set my hand this 21st day of September, 1923.

BURT L. NEWKIRK.